United States Patent
Kulkarni et al.

(10) Patent No.: US 10,773,215 B2
(45) Date of Patent: Sep. 15, 2020

(54) SELF-CLEANING AND MONITORING FILTRATION SYSTEM

(71) Applicant: Eaton Intelligent Power Limited, Dublin (IE)

(72) Inventors: Shrinivas Kulkarni, Pune (IN); Chris W. Schottler, Chanhassen, MN (US); Suhas Dhakate, Maharashtra (IN); Pratyush Rout, Odisha (IN); M S Shashishekar, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 53 days.

(21) Appl. No.: 16/228,943

(22) Filed: Dec. 21, 2018

(65) Prior Publication Data
US 2020/0197873 A1 Jun. 25, 2020

(51) Int. Cl.
*B01D 65/02* (2006.01)
*B01D 33/073* (2006.01)
*B01D 33/48* (2006.01)

(52) U.S. Cl.
CPC ......... *B01D 65/027* (2013.01); *B01D 33/073* (2013.01); *B01D 33/48* (2013.01); *B01D 2201/08* (2013.01); *B01D 2311/04* (2013.01); *B01D 2321/02* (2013.01)

(58) Field of Classification Search
None
See application file for complete search history.

(56) References Cited

U.S. PATENT DOCUMENTS

| | | | |
|---|---|---|---|
| 3,959,140 A | 5/1976 | Legras | |
| 5,527,462 A | 6/1996 | Davis et al. | |
| 7,093,721 B2 | 8/2006 | Imanse | |
| 2003/0168389 A1* | 9/2003 | Astle | B01D 27/101 210/85 |
| 2014/0061129 A1* | 3/2014 | Hoz | C02F 1/441 210/636 |
| 2015/0174513 A1 | 6/2015 | Shaw | |

FOREIGN PATENT DOCUMENTS

WO    WO 2014/066232    5/2014

* cited by examiner

*Primary Examiner* — Richard C Gurtowski
(74) *Attorney, Agent, or Firm* — Fay Sharpe LLP

(57) ABSTRACT

A filter system of the type having a pressure vessel having an annular filter media therein with a filter wiper piston moved by an air or hydraulic piston actuator. An electrically operated drain valve purges wiped contaminants from the filter media. Pressure sensors provide a signal to a controller of vessel inlet and outlet pressure. Position detectors provide signals to the controller of the drain valve position and filter actuation position. The controller has a computer which computes from the sensor inputs parameters representative, in real time, of entry fluid condition, relative amount of filter contamination, relative amount of filter wear, and relative amount of contaminant removal, and provides signals of the representation to indicators providing visual display thereof.

18 Claims, 9 Drawing Sheets

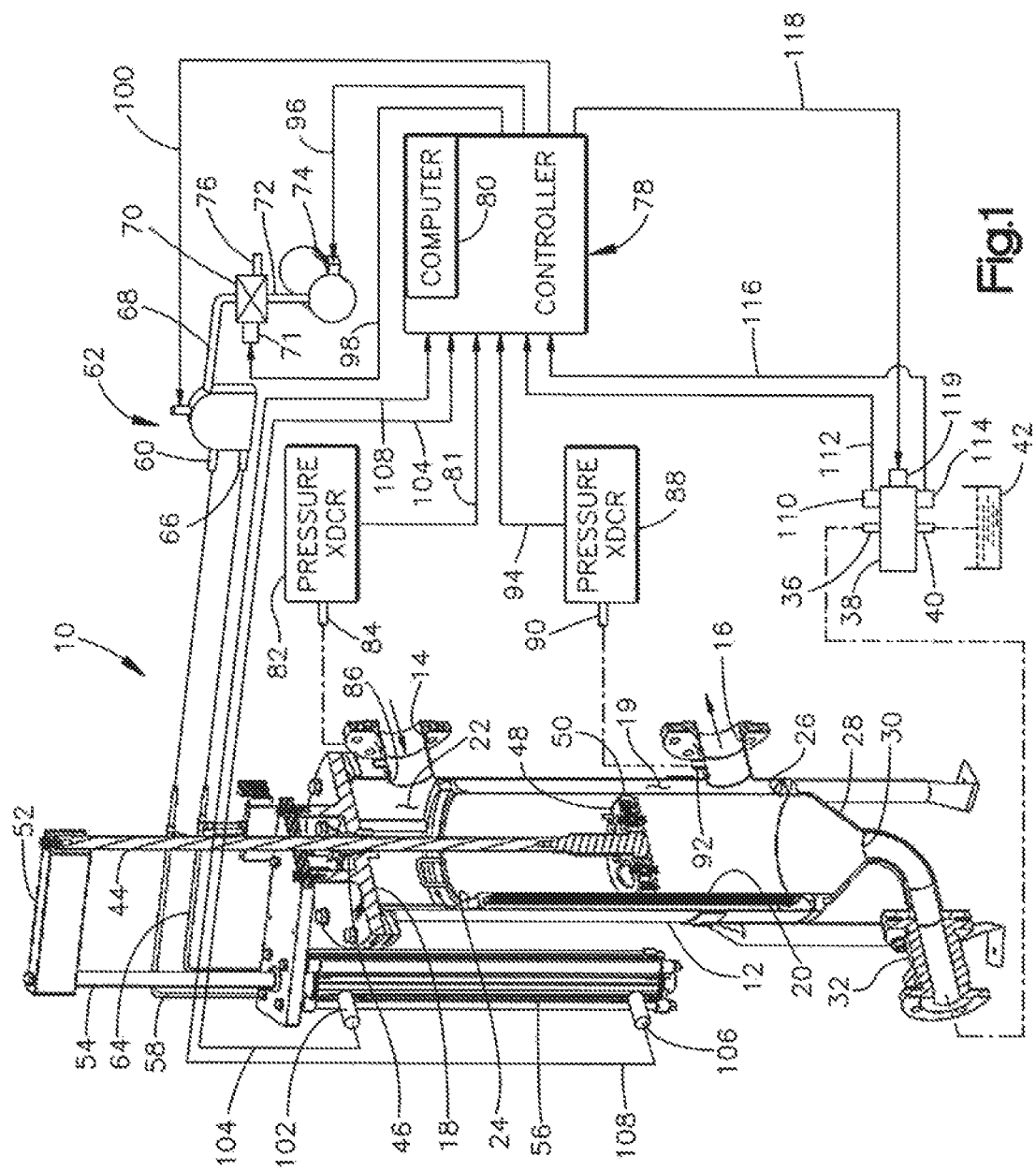

SELF-CLEANING AND MONITORING FILTRATION SYSTEM

BACKGROUND

The present disclosure relates to fluid filtration systems and particularly systems of the type employed for filtering fluid flow in commercial water treatment and chemical processing systems. Filtration systems of the aforesaid type typically employ a pressure vessel having a removable filter media element or cartridge which receives contaminated pressurized fluid through an inlet and the filtered flow or filtrate passes through the filter media and outwardly through an outlet.

Fluid filtration systems utilized in commercial processes typically have flow volume in the range of 2 to 1500 gallons per minute or 7.5 to 5680 liters per minute, and operation with fluid pressures at the inlet in the range of 150 psi to 300 psi and may be required to handle fluids at elevated temperatures at the order of 400° F. Filtering vessels and filter media required to handle such fluid flow requirements are relative large and costly to manufacture and must accommodate a broad range of operating fluid requirements.

Filters of this type employed in high volume flow commercial process are critical in the continuous operation of such processes; and, stopping the flow through the filter system for depressurization and removal and replacement of the filter media results in costly downtime and disruption of the processes employing the flow of filtered fluid.

In an effort to reduce or eliminate the down time required for filter cleaning and/or replacement, various techniques have been employed for cleaning the filter element during normal operation without interrupting fluid flow; and have included internal wiping mechanisms for scraping contaminants off of the filter media; and techniques for backwashing the filter which, may require interruption of fluid flow through the inlet. These techniques are performed generally at fixed time intervals based on previous experience and have not provided any way of monitoring in real time, during normal fluid flow operation, the condition of the filter media element or the amount of contaminants accumulated from successive filter cleaning cycles or any way of monitoring the present condition of the wiper.

Thus, it has long been desired to provide a way or means of monitoring the condition of a filter during fluid flow in a continuous large flow fluid filtering system and providing real time indication of the monitored condition of the filter to the system operator. It has further been desired to provide a real time indication of the amount of contaminant accumulated during successive filter cleaning operations and to indicate the accumulated amount to the system operator and the need of appropriate purging; and, it has been desired in such filters to provide a real time indication of the need to perform a cleaning operation on the filter or the need for replacement.

SUMMARY

The present disclosure describes a fluid filtration system, particularly that of the type employed for high volume flow as experienced in commercial and industrial processes. The system employs a pressure vessel with a filtering chamber having filter media disposed therein, typically in the form of an annular filtering element and the chamber has an inlet for receiving pressurized fluid therein which communicates exclusively with the upstream side of the filter and an outlet communicating exclusively with filtrate from the downstream side of the filter media. A filter media cleaner is provided in the form of a wiper which wipes contaminant from the upstream side of the filter media into a collecting or purge chamber provided in the pressure vessel. A drain or purge valve is connected to the purge chamber and is operable upon selective opening to drain contaminant from the purge chamber. An actuator which may be of the pneumatic or hydraulically operated piston-type is moved by an actuator disposed on the pressure vessel; and, the actuator is supplied with a source of pressurized air or hydraulic fluid from a pump and reversing valve for effecting extension and retraction of the wiper along the filter media. The operation of the wiper is controlled by a controller with a computer which, in response to inputs from pressure sensors at the inlet and outlet is operable to compute the pressure difference in the sensed pressures at the initiation and completion of the wiper stroke. The controller computes the difference and compares the computed difference with predetermined values determined for known amounts of filter clogging; and, the controller provides a signal indicative of the degree or relative amount of filter clogging. The controller provides a signal to an indicator which provides a visible indication of the relative amount or degree of filter clogging to enable a system operator to determine whether a filter cleaning operation is required.

The drain valve has sensors which indicate the initiation of drain valve opening and completion of opening of the drain valve. The controller records the difference between the sensed inlet and outlet pressure, $\Delta P$, at the start of opening of the drain valve and records $\Delta P$ upon the drain valve becoming fully open, and computes the ratio of $\Delta P$ at start and $\Delta P$ at completion. The computer then compares the computed ratio with such ratios, measured for known amounts of contamination, and provides a signal indicative of the comparison to an indicator which visibly displays the relative amount of contaminant in the purging chamber to the system operator to indicate whether clogging of the purge valve is imminent. The controller records the value of $\Delta P$ before purge valve opening and after closing and compares the difference between the $\Delta P$ and provides a signal indicative of the relative amount of removal of contaminant.

For determining in real time the condition of the filter media, the controller records the inlet and outlet pressures and computes the difference $\Delta P$ and records the computed difference for each of designated number of successive filter cleaning cycles and sums the accumulated values of $\Delta P$; and, when the computed sum reaches a predetermined threshold the controller is operative to open the purge drain valve to enable a purge or contaminant draining cycle.

The system of the present disclosure monitors the quality of the pressurized fluid provided at the inlet by computing the value of the difference between inlet and outlet pressure $\Delta P$ over the duration of the contaminant wiping cycle and computes the time rate of change of the difference to determine the time rate of change. The time rate of change is then compared with predetermined time rates of change for known conditions of the particular fluid being processed; and, when the computed time rate of change exceeds various predetermined thresholds for such known conditions the controller is operative to provide a signal in real time indicative thereof. The signal from the controller is provided to an indicator which visibly displays the condition of the fluid at the inlet to enable a system operator to evaluate whether any corrective action is required.

In the system of the present disclosure, sensors are provided to sense start and completion of wiper forward movement; and, the controller is enabled to record the difference in inlet pressure and outlet pressure ΔP at the beginning and completion of the forward movement or extension of the wiper during the cleaning cycle. The controller then computes the ratio of ΔP at the beginning and ΔP at the completion of the forward motion at each successive cleaning cycle and compute the ratio of the measured ΔP's for the cleaning cycle. The computed ratios are then compared with predetermined thresholds for known conditions of the wiper; and, the controller provides a signal indicative of the computed comparison. The comparison signal from the controller is then provided to an indicator which visibly displays the relative amount of wear of the wiper in real time to enable the system operator to determine whether wiper replacement is required.

The present disclosure thus describes a fluid filter system of the type employed for high volume flow in commercial and industrial applications which provides for real time monitoring and indication of the condition of the filter media, the filter cleaning wiper, the amount of contaminant, and the condition of the pressurized fluid supply to the inlet, and provides real time indications through visible displays on indicators so as to enable decisions by the system operator as to whether services or maintenance is required.

BRIEF DESCRIPTION OF THE DRAWINGS

FIG. 1 is a schematic of the system showing a pressure vessel sectioned longitudinally to show the flow connections and the details of the wiper mechanism;

DETAILED DESCRIPTION

Figure 2A:
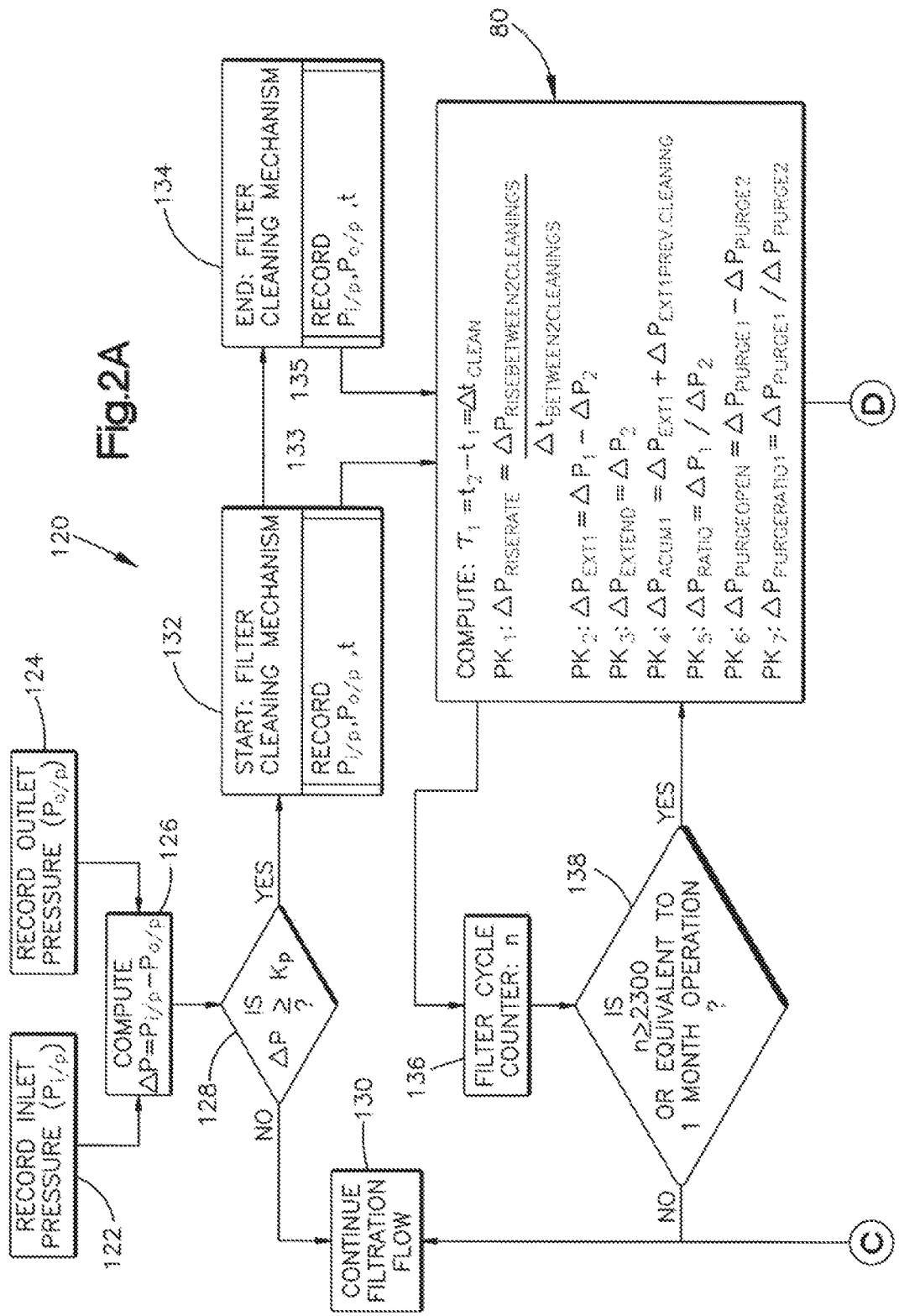
FIG. 2A is a portion of a flow diagram for the operation of the system of FIG. 1.

Referring to FIG. 1, the system of the present disclosure is indicated generally at 10 and includes a pressure vessel 12 having a generally hollow cylindrical configuration with an inlet 14 adjacent the upper end of the pressure vessel 12 and an outlet 16 at the lower end of the pressure vessel 12. The pressure vessel has a closure or lid 18 removably attached to the upper end thereof for sealing the interior of the pressure vessel.

An annular filter media or element 20 is disposed in a filtering chamber 22 communicating with the inlet 14. The upper end of the annular filter 20 is sealed by a suitable seal ring 24; and, the lower end of the annular filter 20 is also sealed about the interior of the pressure vessel by a suitable seal ring 26 such that the interior of the annular filter 20 communicates exclusively with the inlet 14 and is isolated from the outlet 16. The outlet 16 thus communicates exclusively with the annular space 19 between filter 20 and the inner periphery of the pressure vessel 22.

The lower end of the pressure vessel 12 has received thereover and secured thereon an inverted dome or cone structure 28 which forms on the interior thereof a collecting chamber for contaminants removed from the filter as will hereinafter be described. The cone 28 has an outlet port 30 on apex or the lower extremity thereof which is connected through conduit 32 to a drain 34 which is connected to the inlet 36 of an electrically operated drain valve 38 which has its outlet 40 connected to discharge contaminant to a collector 42.

The pressure vessel 12 has an operating rod 44 extending therein and outwardly therefrom which is slidably received through guides or bushings 46 provided in the cover 18. The operating rod 44 has a piston 48 attached to the lower end thereof within the pressure vessel filtering chamber 22 and interiorly of the filter media 20. Piston 48 has an annular wiper 50 disposed about the periphery thereof which is configured for wiping the interior surface of the annular filter 20.

The upper end of the operating rod extends outwardly through guides 46 and has a connecting bar 52 attached thereto at one end thereof with the opposite end of the bar connected to a piston rod 54. Piston rod 54 extends downwardly from bar 52 into a fluid pressure cylinder 56 with the rod 54 having connected to the lower end thereof within the cylinder 56 a piston for, upon pressurization of the interior of the cylinder 56 above the piston (not shown), moving the piston rod 54 downwardly in an extension stroke upon fluid pressure being applied in the cylinder above the piston. The rod 54 is moved upwardly in a retraction stroke in response to fluid pressure in the cylinder being applied to the underside of the piston. The movement of the piston rod 54 thus causes bar 52 to move the rod 44 and wiper 50 upwardly or downwardly within the annular filter 20 in response to upper or lower pressurization in the cylinder 56.

The cylinder 56 has a fluid pressure conduit 58 connected thereto, to apply fluid pressure to the upper end thereof, which conduit 58 is connected to one outlet 60 of an electrically reversing valve indicated generally at 62; and, a conduit 64 is connected to the lower end of the fluid pressure cylinder 56 and to a second outlet 66 of the reversing valve 62. Thus, the reversing valve 62 is operable to control alternately pressurizing the cylinder 56 above the piston through conduit 58 to cause the piston to move downwardly for the extension stroke and for pressurizing the cylinder below the piston for moving the piston upwardly. The reversing valve 62 has its inlet 68 connected to the outlet of an electrically operated shutoff and vent valve 70 which has its inlet 72 connected to the outlet of an electrically controlled fluid pressure pump 74. The shutoff and vent valve 70 has an exhaust or vent port 76 for exhausting fluid pressure from the one of the conduits 58, 64 which is pressurized upon closure of the valve 70.

The system 10 includes an electronic controller indicated generally at 78 which is connected with an associated computer 80 which may be included physically with the controller or may be remotely connected thereto. If desired, the controller and computer may be mounted proximate to the pressure vessel 12 or may be remotely disposed. The controller 78 receives an input along line 84 from a pressure transducer 82 connected through conduit 84 to receive a fluid pressure signal from a pressure tap 86 provided in the inlet 14. Similarly, a second pressure transducer 88 which has its inlet 90 connected to a pressure tap 92 provided in the pressure vessel outlet 16. The pressure transducer 88 provides its output along line 94 to the controller 78. The controller is operatively connected along line 96 to control the pump 74 and through another line 98 to control the opening and closing of the shutoff and vent valve 70.

The reversing valve receives an operating control signal from the controller along line 100 for providing a signal to control the reversing of the flow in the outlets thereof.

The fluid pressure cylinder 56 has disposed thereon at the upper end thereof a position sensor 102 which provides a signal along line 104 to an input of the controller. A second position sensor 106 is disposed on the fluid pressure cylinder 56 adjacent the lower end thereof and provides a signal along line 108 to an input of the controller 78. Sensor 102 is operative to detect the beginning of forward or downward motion of the piston (not shown) within the cylinder 56; and, the sensor 106 is operative to provide a signal indicating that the piston within the cylinder 56 has reached its downward extremity of extension movement.

The drain valve 38 has a first position detector switch 110 provided thereon which is operative to detect the start of opening movement of the valve and provide a signal indicative thereof along line 112 to the controller 78. A second detector switch 114 is provided on the drain valve 38 and is operative to detect the completion of opening of drain valve 38 and is operative to provide a signal indicative thereof along line 116 to an inlet of the controller. The controller 78 provides an output signal along line 118 to control the operation of the drain valve 38. The controller 78 is thus operative in response to pressure signals from the transducers 82, 88 and the position indicators 102, 106 and drain valve position indicators 110, 114 to control not only the operation of the wiper piston 48 but also the pump, valves 70, reversing valve 62, and drain valve 38 according to the strategy hereinafter described.

Referring now to FIG. 2A, the strategy of operation for the monitoring and control of the system of the present disclosure is indicated generally at 120 as a flow diagram; and, at step 122 records the inlet pressure Pup and the outlet pressure $P_{O/P}$ at step 124, and proceeds to compute the difference therebetween ΔP at step 126. The system then proceeds to step 128 and inquires as to whether ΔP is equal to or less than $K_F$ a predetermined constant representative of a known unacceptable amount of clogging of the filter media 20. If the determination in step 128 is negative, the system continues filtration flow at step 130. However, if the determination at step 128 is affirmative, the system proceeds to step 132 and records the value of $P_{I/P}$ and $P_{O/P}$ and the time t, at which time the system signals the pump 74, valve 76, and valve 62 to pressurize through conduit 58, the cylinder 56 for beginning downward motion of the piston therein and the cleaning operation. At the end of the filter cleaning, the system records $P_{I/P}$, $P_{O/P}$, and time t at step 134. The recording of step 132 and step 134 are supplied to the computer 80. The computer is operative to perform the following computations:

$PK_1$: $\Delta P_{RISE\ RATE} = \Delta P_{RISE\ BETWEEN\ TWO\ CLEANINGS} / \Delta t_{BETWEEN\ TWO\ CLEANINGS}$;

$PK_2$: $\Delta P_{EXT1} = \Delta P_1 - \Delta P_2$;

$PK_3$: $\Delta P_{EXT\ END} = \Delta P_2$;

$PK_4$: $\Delta P_{ACUM1} = \Delta P_{EXT1} + \Delta P_{EXT1\ PREVIOUS\ CLEANING}$;

$PK_5$: $\Delta P_{RATIO} = \Delta P_1 / \Delta P_2$;

$PK_6$: $\Delta P_{PURGE\ OPEN} = \Delta P_{PURGE1} - \Delta P_{PURGE2}$;

$PK_7$: $\Delta P_{PURGE\ RATIO1} = \Delta P_{PURGE1} / \Delta P_{PURGE2}$; and
$\tau_1 = t_2 - t_1 = \Delta t_{CLEAN}$.

The system then proceeds to step 136 to count the number of cycles of filter operation "n" and proceeds to step 138 to inquire whether n is greater than 300, or equivalent to one month of operation of the filter system.

If the determination at step 138 is negative, the system returns to step 130 and continues filtration flow. The parameters computed by the computer 80 are provided to step 140, 142, 144, 146, and 148 for further operations as will hereinafter be described.

Figure 2B:
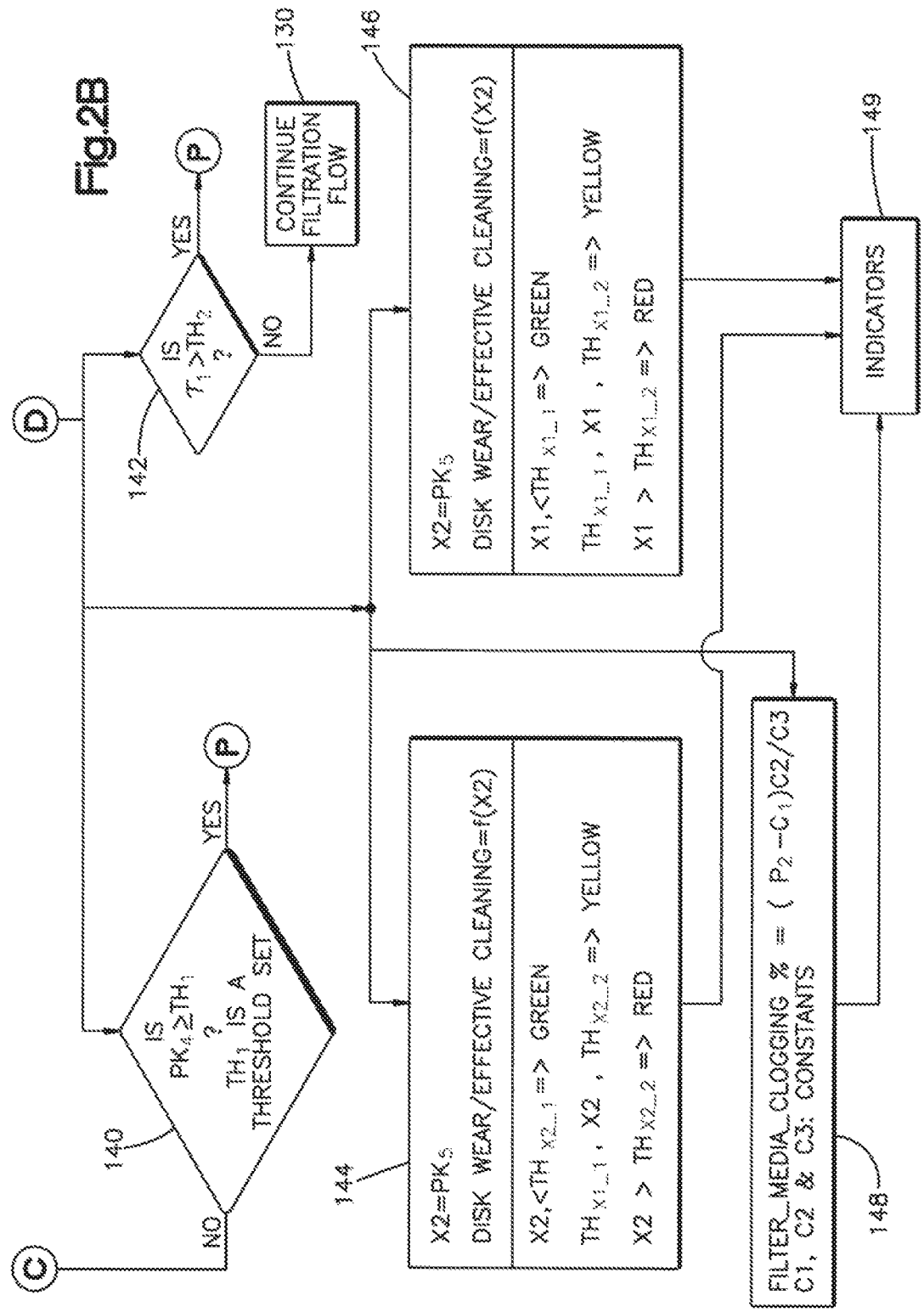
FIG. 2B is a continuation of FIG. 2A from the location thereon designed by the character "D" in a circle.

Referring to FIG. 2B, at step 142, the system determines whether $\tau_1$ is greater than a predetermined threshold $TH_2$; and, if the determination is negative, the system returns to step 130 and continues filtration flow. However, if the determination at step 142 is affirmative, the system proceeds to the continuation of the flow diagram at "P" (in a circle) on FIG. 3 for some diagnostics, wherein at step 150, a determination is made as to whether the computer has provided a signal to the valve 70 to actuate the piston in cylinder 56. If the determination at step 150 is negative, the system proceeds to steps 152, 154, 156 and 158. If the determination at step 152 is that the switch powering the valve 70 along line 98 is closed and the output is zero, the system continues operation at step 175. If the determination at step 152 is that the output of the switch powering solenoid or valve 70 is "high", e.g., at 24 volts, the system proceeds to step 160 and inquires as to whether $\tau_1$ is greater than $TH_2$, where $\tau_1$ is the time required for filter cleaning operation and $TH_2$ is a predetermined threshold for the time required for normal filter cycling. If the determination at step 160 is negative, the system proceeds to continue normal operation at step 175. If the determination at step 160 is affirmative, the system proceeds to provide a fault indication at step 162 to the effect that the cylinder supply valve 72 is not opening on command.

At step 152, if the determination is that the switch output is "low", e.g., zero volts, the system proceeds to step 175 for normal filtering operation. If the determination at step 152 is that the output of the closed switch is zero volts, the system determines at step 164 whether $\tau_1$ is greater than a predetermined threshold value $TH_1$ and if the determination is affirmative, the system proceeds to step 166 to indicate a fault that the cylinder valve 70 is not closed nor open with the command, and is therefore stuck. If the determination is negative, the system proceeds to normal operation.

Regarding step 158, if the open switch provides no output or zero volts, the step then proceeds to step 164. If, however, the output of the open switch at step 158 is 24 volts, the system proceeds to step 175 for normal filtering operation.

At step 154, the system determines whether the output of the open switch for valve 70 is "high" at 24 volts or "low" at zero volts; and if the output is zero volts, the system proceeds to step 175 for normal operation. However, if the determination at step 154 is that the open switch provides 24 volts output, the system proceeds to step 168 where a determination is made whether $\tau_1$ is greater than $TH_2$; and, if the determination at step 168 is affirmative, the system provides an output that the cylinder valve is open without a command. At step 170, if the determination at step 168 is negative, the system proceeds to step 175 for normal operation.

If the system determines at step 156 that the closed switch provides a 24 volt output, the system proceeds to step 175 for normal operation. However, if the determination at step 156 is that the closed switch output is zero volts, the determination is then made at step 172 as to whether $\tau_{1a}$, the time between "Closing" command given and the time when the valve is completely closed, is greater than $TH_1$; and, if the determination is negative, the system proceeds to step 175 for normal operation. However, if the determination at step 172 is affirmative, the system proceeds to indicate that the cylinder valve is not closing without command at 174.

Figure 4:
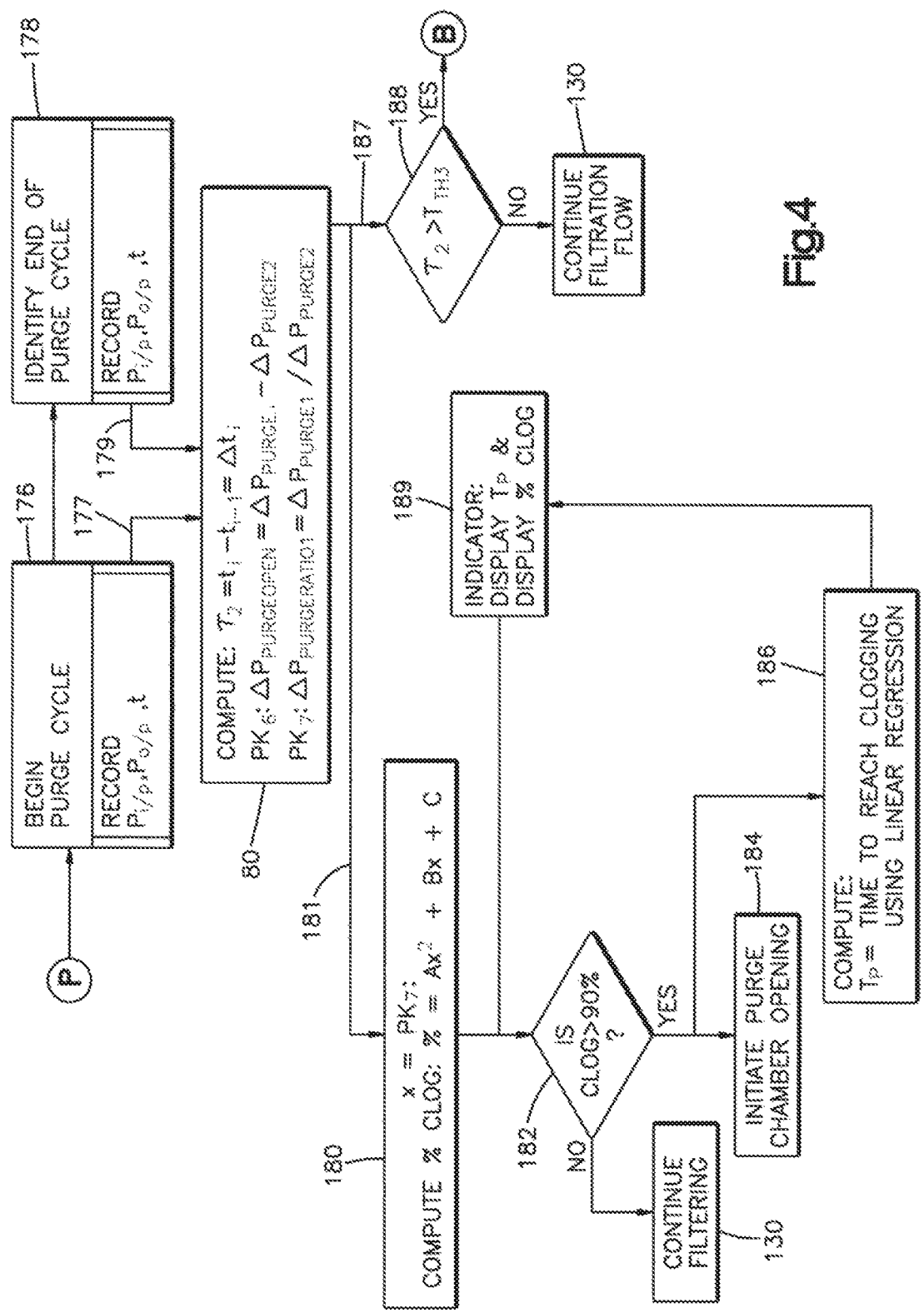
FIG. 4 is a continuation of the flow diagram of FIG. 2 and connects to the location thereon designated by the reference character "P" in a circle.

With reference to FIG. 2B, if the determination at step 140 is affirmative, the system proceeds to purge cycle operations "P" (in a circle) as shown in FIG. 4, wherein at step 176, purge cycle is begun for the opening of the purge or drain valve 38 by the controller 78 providing a signal along line 118 to the electrical actuator, which may be a solenoid, 119 controlling the opening of the purge drain valve 38 and the value of $P_{I/P}$, $P_{O/P}$, and time t are recorded. At the end of the purge cycle at step 178, the system again records the values of $P_{I/P}$, $P_{O/P}$, and time t and provides the values from steps 176, 178, to the computer 80 along lines 177 and 179, respectively. The computer 80 then provides output along line 181. At step 180, the computer 80 calculates $\tau_2$ equals the time required for the performance of the purge cycle between steps 176 and 178 as $\Delta t_1$. The computer also computes $PK_7$: $\Delta P_{PURGE\ RATIO} = \Delta P_{PURGE3}/\Delta P_{PURGE4}$ and $PK_6$. The system then utilizes the information from the computer at step 180 to compute the percent of clogging of the filter from the expression $Ax^2+Bx+C$, where x is $PK_7$ as determined by the computer. The system then proceeds to step 182 and determines whether the percent of clog from step 180 is equal to or greater than 90%; and, if the determination at step 182 is negative, the system proceeds to step 130 for continuing filtering flow. If the determination at step 182 is affirmative, the system proceeds to step 184 and initiates opening of the purge chamber 34, 30, and 28. If the response at determination 182 is affirmative, the system also computes, at step 186, the time $T_P$ to reach clogging using linear regressing techniques. The output from step 180 and step 186 are also applied to an indicator indicated generally at 149 which will be described hereinafter in greater detail. If the purge chamber is clogged, it will be necessary to remove valve 38 and the purge chamber mechanically cleaned.

The value of $\tau_2$ computed by the computer is also applied along line 187 to step 188, where the system asks whether $\tau_2$ is greater than $TH_3$, a predetermined threshold value. If the determination at step 188 is negative, the system continues to step 130 for continuing filtration flow.

Figure 5:
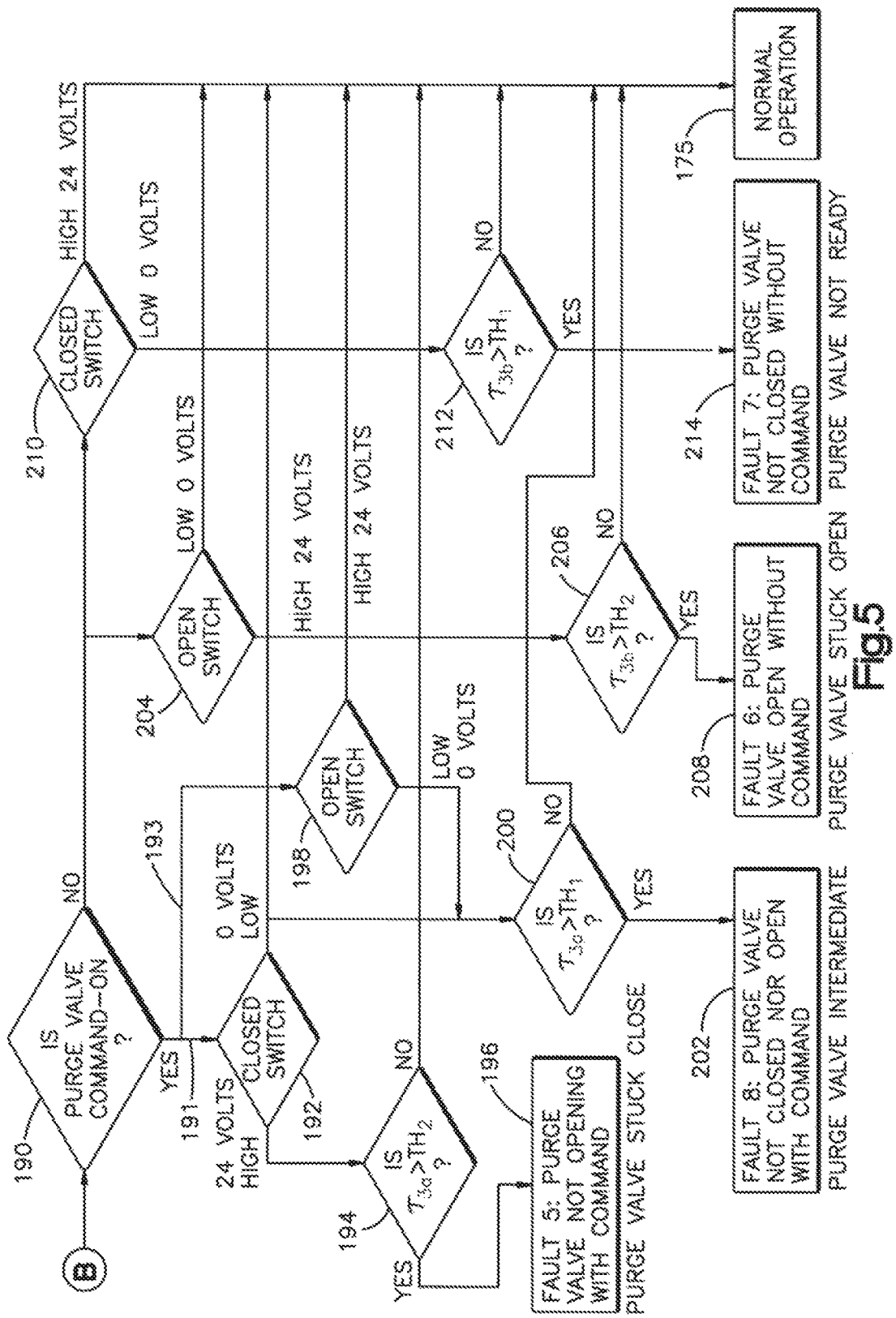
FIG. 5 is a continuation of FIG. 4 and connected thereto at the location indicated thereon by the reference character "B" in a circle.

However, if the determination at step 188 is affirmative, the system proceeds to diagnostics at "B" (in a circle) as shown in FIG. 5, wherein at step 190, a determination is made that the computer has provided a signal, e.g., command "ON" to the solenoid or actuator 119 for operating the purge valve 38. If the determination at step 190 is affirmative, the system proceeds along line 191 to step 192 where a determination is made as to whether the output of closed switch is 24 volts or zero. If the determination at step 192 is that the output of the switch is 24 volts, the system proceeds to step 194 and inquires whether $\tau_{3a}$ which is computed in the same manner as $\tau_2$, i.e., computed for the time between "Opening" command and complete opening; and, if the determination at step 194 is affirmative, the system proceeds to a "Fault 5" indication at step 196 to the effect that the purge valve is not opening with command, indicating that the purge valve is stuck in the closed position. However, if the determination at step 194 is negative, the system proceeds to step 175 for normal operation.

If the determination at step 192 is that the output of the closed switch is zero volts, the system proceeds to step 175 for normal operation.

If the determination at step 190 is affirmative, the signal is applied along line 193 to step 198 which determines whether the open switch provides an output of 24 volts, in which case the system proceeds to step 175 for normal filtering operation. However, if the determination at step 198 is that the open switch output is zero volts, the system proceeds to step 200 and makes the determination as to whether $\tau_3$ is greater than $TH_1$; and, if the determination at step 200 is affirmative, the system proceeds to step 202 and provides a "Fault 8" indication that the purge valve is not closed nor open with command, which is interpreted as the purge valve is in intermediate position.

If the determination at step 190 is No, e.g., that the purge command "ON" is not being given, the system inquires at step 204 whether the output of the switch controlling the purge valve solenoid is outputting zero volts or 24 volts in the open position; and, if the determination at step 204 is that the output is 24 volts, the system proceeds to step 206 and inquires whether $\tau_{3b}$ is greater than $TH_2$. If the determination at step 206 is negative, the system proceeds to step 175 for normal operation. However, if the determination at step 206 is affirmative, the system proceeds to step 208 and indicates a "Fault 6" that the purge valve is open without command or that the purge valve is stuck in the open position. If the determination at step 190 is negative, the system also inquires at step 210 with the valve solenoid operator in the closed position as to whether the output of the switch is 24 volts or zero volts; and, if the output is 24 volts, the system proceeds to step 175 for normal operation. However, if the determination at step 210 is that the output of the switch is zero volts, the system proceeds to step 212 and inquires as to whether $\tau_{3b}$, the time between "Closing" command given and the time the purge valve is completely closed, is greater than $TH_1$; and, if the determination is negative, the system proceeds to step 175 for normal operation. However, if the determination of step 212 is affirmative, the system proceeds to step 214 to indicate a "Fault 7" that the purge valve is not closed without command.

Referring to FIG. 2, at step 144, the system compares the $\Delta P$ ratio $PK_5$ with a predetermined threshold $TH_{X2-1}$ to determine if the wiper disk is effectively wiping the contaminant from the filter media. The system compares the parameter $PK_5$ with another threshold $TH_{X1-1}$ and a third predetermined threshold $TH_{X2-2}$ to determine if the disk is worn but functioning acceptably. The system then inquires whether the parameter $PK_5$ is greater than another predetermined threshold $TH_{X2-2}$ representative of an unacceptable amount of wear of the wiper. The system thus determines whether the parameter $PK_5$ is within any of three discrete ranges; and, the system provides a signal indicative thereof to indicator 149.

At step 146, the system employs the computed parameter $PK_1$ and inquires whether it is less than $TH_{X1-1}$ or between parameter $TH_{X1-1}$ and another predetermined value $TH_{X1-2}$. The system further inquires whether the parameter $PK_1$ is greater than $TH_{X1-2}$. The system then outputs a signal indicative of the results of the comparison to one of the displays of the indicators 149 and provides an indication thereon in which of the discrete bands the parameter $PK_1$ is present. The system thus determines at step 146 the present condition or quality of the inlet fluid and provides a visible display thereof on the indicators 149. The discrete bands in steps 144 and 146 in the illustrated version of the system in the present disclosure comprise green, yellow, and red bands on the indicators as will hereinafter be described in greater detail.

Referring to FIG. 2 at step 148, the system determines the percent of filter media clogging from computations of the parameter $\Delta P_2$ with predetermined constants $C_1$, $C_2$, and $C_3$ representative of known percentages or amounts of contaminant on the filter and provides an indication thereof to the indicator 149, thus giving a visible display of the percentage of clogging of the filter media.

Figure 6:
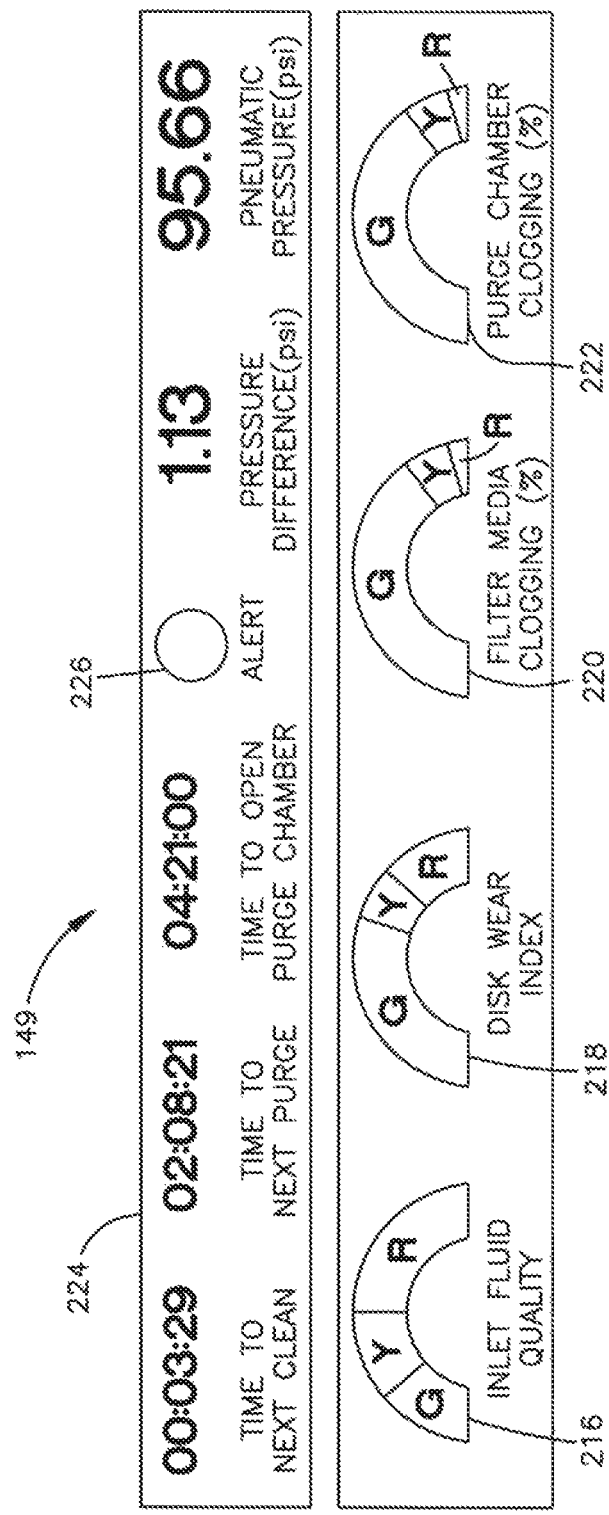
FIG. 6 is a view of the display of a version of the indicators employed in the present disclosure.

Referring to FIG. 6, one version of the indicator 149 is illustrated in which the discrete bands are displayed in arcs of different color, particularly green ("G"), yellow ("Y"), and red ("R"), where green represents normal or acceptable range of operation, the yellow band indicates a discrete range indicating that the operation is approaching an unacceptable condition. The discrete band displayed in red indicates that the system is in an unacceptable condition of operation and corrective action is required. In the present practice, the indicator for inlet for quality or condition is shown as an analog indicator with a movable pointer moving through the color bands which are displayed in an arc as indicated by reference numeral 216.

The indicator for the wiper disk wear index is similarly displayed as discrete bands of an arcuate display in green, yellow, and red as an analog indicator with a needle indicated at 218 as the present condition of the wiper disk.

The percent of filter media clogging is indicated at 220 as an arcuate band of discrete ranges of different color as an analog indicator with a needle indicating the color band representative of the present condition of the percent of clogging of the filter media, wherein the red band represents an unacceptable condition or clogged condition is illustrated at 95%.

The percent of purge chamber clogging is indicated by a separate display in the form of an arcuate band 222 which has separate discrete segments of different colors and the present condition indicated by a movable needle in an analog representation. The band colored red represents an unacceptable or fully clogged condition and is illustrated as set at 95%. The indicator 149 in the present version also has a strip or panel 224 which displays in digital form the time to the next filter cleaning operation, the time to the next purge by the drain valve, and the clock time to open the purge chamber, and also panel 224 may also have an amber alert light 226 which also receives a signal from the computer to illuminate upon the system experiencing any of the faults shown in FIGS. 3 and 5. The panel 224 also displays the operation values of $\Delta P$ as the pressure difference in psi in digital form and the supply pressure to the actuating cylinder 56 in psi.

Alternatively, the indicator 149 may have the displays 216-222 visibly displayed as digital representations in contrast to an analog indicator. In addition, it will be understood that the computer 80 may be connected to the internet to provide emailing to remote locations and remote data analysis of the outputs of the pressure sensors and position detectors for the wiper piston and the drain valve to permit further data analysis.

Figure 3:
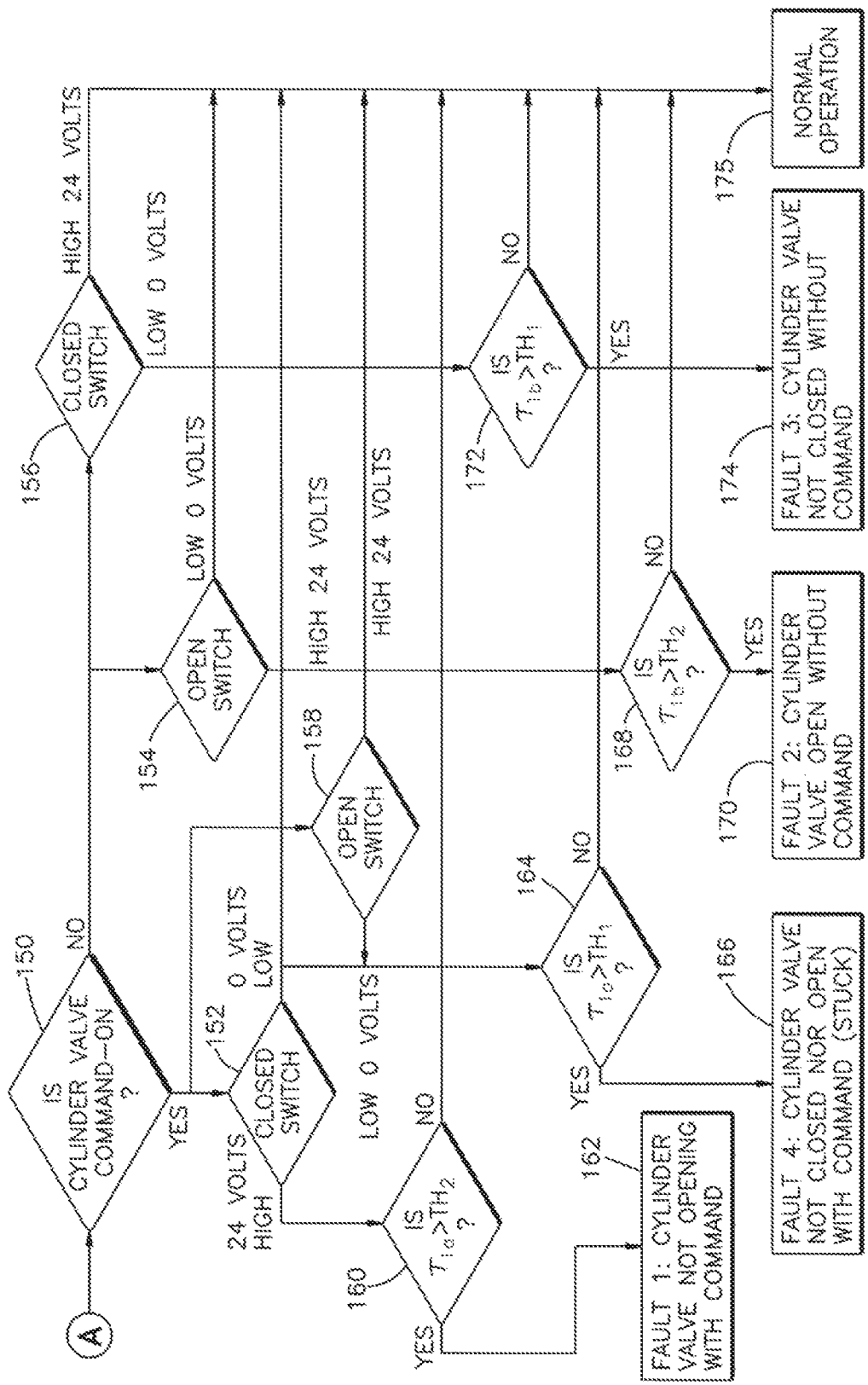
FIG. 3 is a continuation of the flow diagram of FIG. 1 from the location thereon designated by the character "A" in a circle.
Figure 7A:
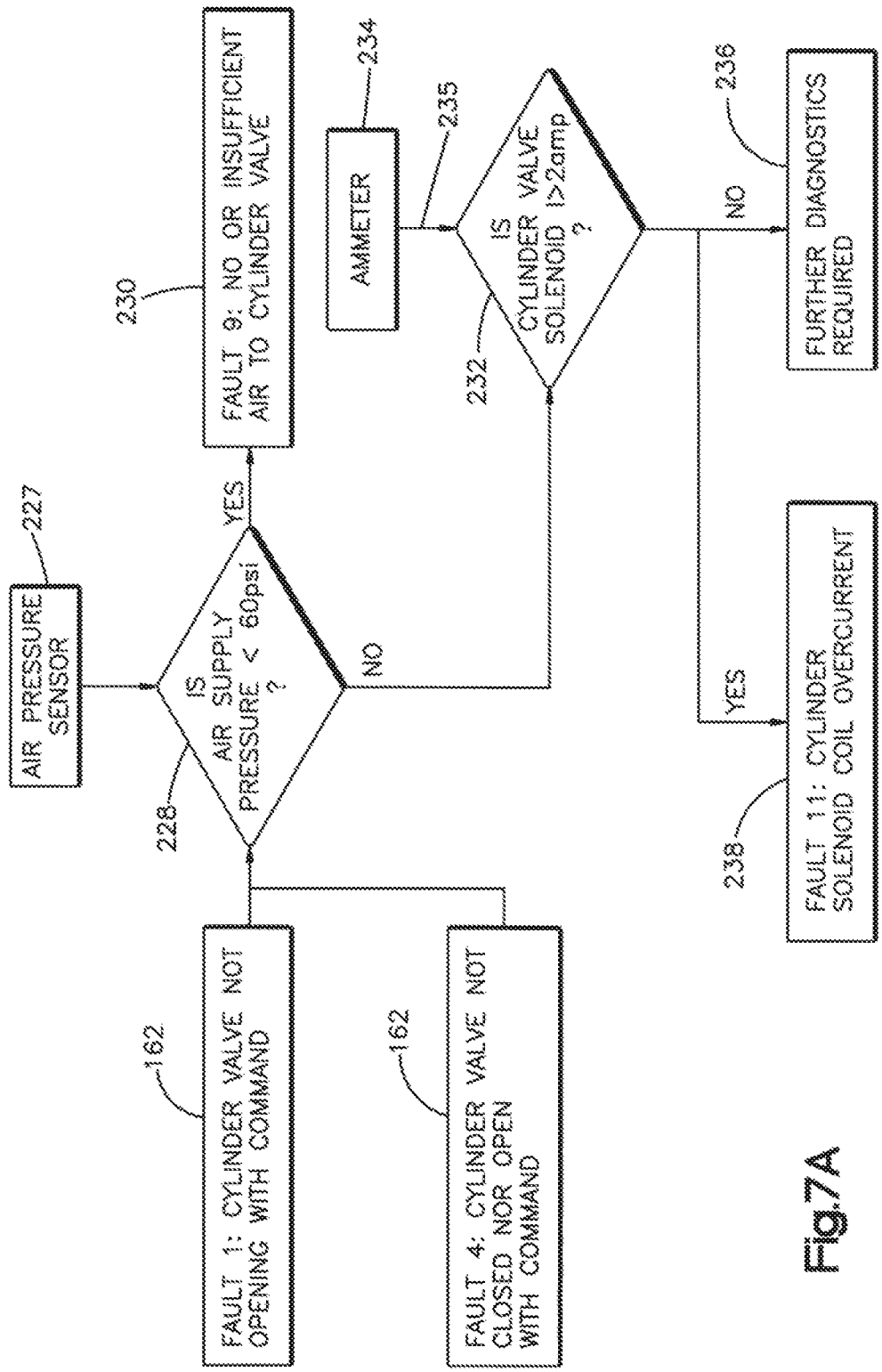
FIG. 7A is a flow diagram of diagnostic strategy based upon fault inputs from the cylinder valve.

Referring to FIG. 7A, the fault indication from step 162 of FIG. 3 is input at step 228, wherein the system asks if the air supply pressure to the cylinder 56 from an air pressure sensor 227, which may be a transducer (not shown in FIG. 1), input along line 229 is less than 60 psi. If the inquiry at step 228 is answered in the negative, the system proceeds to step 232 and in response to an input from ammeter 234, which may be a transducer, along line 235, inquires whether the current "I" from the cylinder valve operator or solenoid is greater than 2 amperes. If the determination at step 232 is negative, the system proceeds to indicate further diagnostics are required at step 236. However, if the determination at step 232 is affirmative, the system proceeds to step 238 and provides a "Fault 11" indication that the cylinder solenoid valve is experiencing overcurrent.

The input to step 228 also indicates "Fault" when the cylinder valve is not closed nor open with command at step 162 as previously described.

Figure 7B:
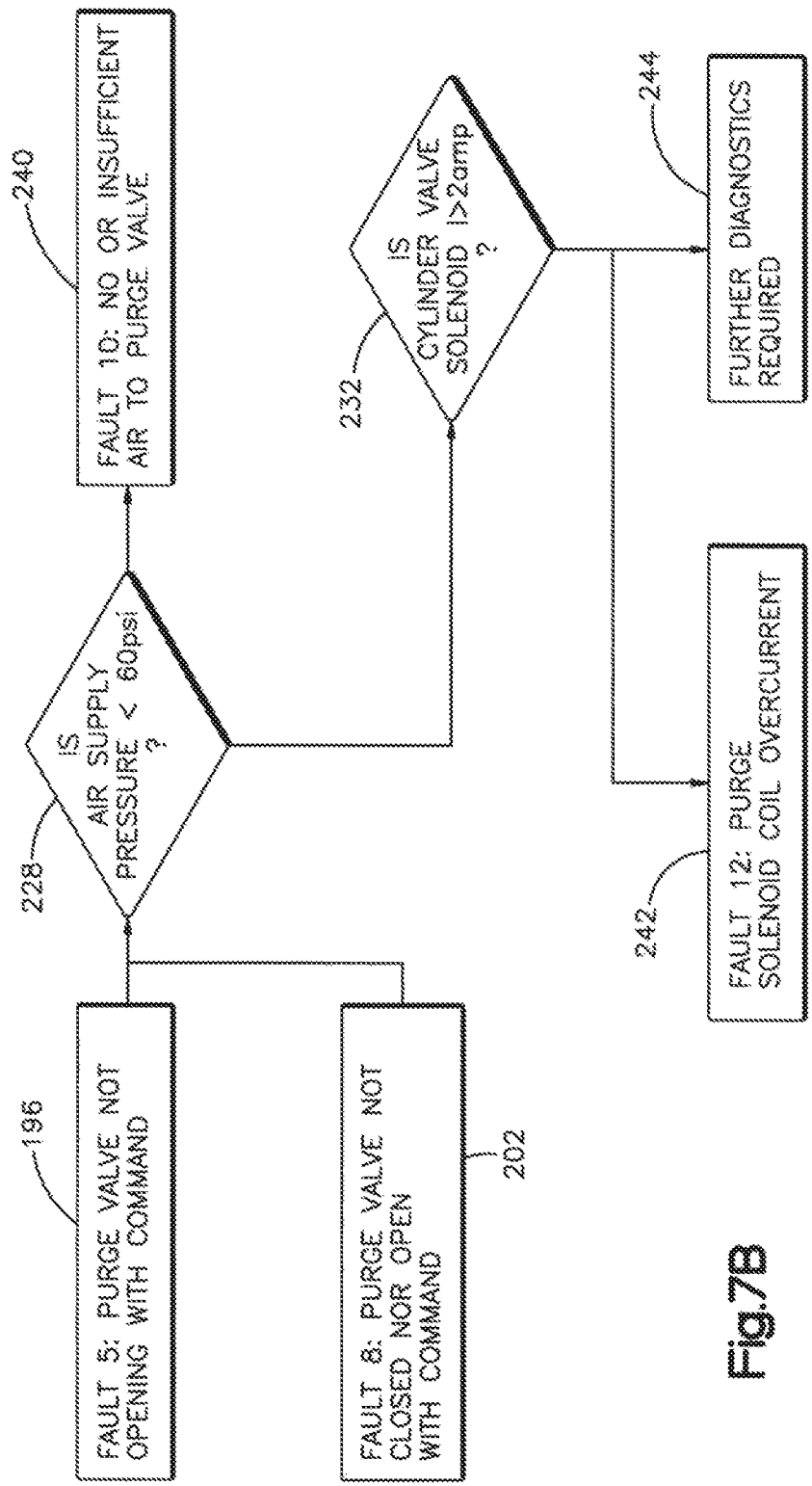
FIG. 7B is a flow diagram similar to FIG. 7A of diagnostics based on inputs from faults of the purge valve and cylinder valve.

Referring to FIG. 7B, the "Fault 5" indication at step 196 is input also to step 228; and, if the determination therein is affirmative, the system indicates "Fault 10" at step 240 that no or insufficient air is being supplied to the purge valve 38. However, if the determination at step 228 is negative, the system proceeds to step 232 and inquires as to whether the solenoid current "I" is greater than 2 amperes. If the determination at step 232 is affirmative, the system proceeds to step 242 and provides an indication "Fault 12" that the purge solenoid coil is experiencing overcurrent. If the determination at step 232 is negative, the system provides an indication at step 244 that further diagnostics are required.

The present disclosure thus provides a fluid filter system with pressure sensors provided at the inlet and outlet and having a wiper for removing contaminant from the filter media and a drain valve for purging or draining the accumulation of the wiped contaminant. A controller with a computer is provided to electrical operators for effecting actuation of the wiper and drain valve in response to parameters computed from the sensor outputs. From the computed parameters, the system provides a representation of (a) the inlet fluid quality, (b) the percentage of disk wear, (c) the percentage of filter media clogging, and (d) the percentage of clogging of the contaminant correcting chamber to the indicators. The controller also provides signals to indicators for visible display of representations (a)-(d) and an alert that operator action is required.

The computer may also conduct disclosed diagnostic procedures for determining faults in the pump/drain valve and wiper operations.

The exemplary embodiment has been described and illustrated with reference to the drawings. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fluid filter system comprising:
(a) a vessel defining a filtering chamber having fluid filter media disposed therein and having an inlet adapted for receiving a flow of pressurized fluid communicating exclusively with an upstream side of the filter media and an outlet communicating exclusively with filtrate on a downstream side of the filter media;
(b) a cleaner operable upon selective activation to remove contaminants from the upstream side of the filter media;
(c) a controller, including a computer, operable to effect activation of the cleaner;
(d) the vessel defining a contaminant chamber for collecting contaminant removed from the filter media;
(e) a drain port with a valve connected thereto, the valve operable, upon selective opening, to drain contaminant from the contaminant chamber;

(f) a pair of sensors disposed to measure a difference $\Delta P$ between fluid pressure at the inlet and the outlet, wherein the controller effects activation of the cleaner in response to threshold values of $\Delta P$;

(g) a first sensor operative in response to initiation of the drain valve opening to provide a first signal indicative thereof to the controller; and (h) a second sensor operative in response to the drain valve completing opening to provide a second signal indicative thereof to the controller wherein the controller is operative to determine a ratio of $\Delta P$ at initiation of drain valve opening to $\Delta P$ at completion of the drain valve opening and operative upon the determined radio exceeding a predetermined threshold to provide a signal indicating that the containment chamber is clogged.

2. The system of claim 1, wherein the cleaner includes a wiper and an actuator operable in response to a signal from the controller to effect extension and retraction movement of the wiper.

3. The system of claim 2, further comprising an indicator operative in response to the signal indicating the containment chamber is clogged to provide a visible indication thereof.

4. The system of claim 1, wherein the controller is operative to compare $\Delta P$ at the drain valve initiating opening and $\Delta P$ at the drain valve completing opening and compute a difference and by comparison of the computed difference with values of the difference for predetermined levels of contaminants, and the controller is operative to provide a level signal indicative of the level of fill of the contaminant chamber.

5. The system of claim 4, further comprising an indicator operative in response to the level signal to provide a visible indication thereof.

6. The system of claim 5, wherein the indicator includes bands of different color for discrete ranges of the second signal and level signal.

7. The system of claim 1, wherein:

(a) the cleaner comprises a wiper disposed in the filtering chamber and operable upon the selective activation for a cycle of forward and return movement along the upstream side of the filter media for removing contaminant therefrom; and, (b) the vessel defining a filtering chamber includes an actuator operable upon receiving a signal from the controller to effect a series of successive cleaning cycles each comprising the forward and return movement of the wiper and including a sensor detecting start of the forward movement and a sensor detecting completion of forward movement, wherein the controller records a time $\Delta t_{1,2}$ between two adjacent successive cleaning cycles and is operable to determine a time rate of change of $\Delta P$, and compare the determined time rate of change with predetermined values thereof, for known conditions for a particular fluid being filtered; and, the controller is operative to generate a rate of change signal indicative of the comparison.

8. The system of claim 7, further comprising an indicator receiving the generated rate of change signal and operative to indicate the comparison.

9. The system of claim 8, wherein the indicator is operative to visibly display the comparison in discrete ranges of different colors.

10. The system of claim 7, wherein the controller is operative in response to recorded values of $\Delta P$ at the start of the forward motion of the wiper, $\Delta P_S$ and $\Delta P$ at the completion of the forward motion, $\Delta P_{EXTEND}$ and determine the ratio $R=\Delta P_S/\Delta P_{EXTEND}$ thereof for successive cleaning cycles; and, the controller is operative to compare the determined ratio with predetermined values of R for known conditions of wiper wear and provide a signal indicative of wiper present condition.

11. The system of claim 10, further comprising an indicator receiving the comparison signal and operative in response thereto for visibly displaying the present wear condition of the wiper.

12. The system of claim 11, wherein the indicator visibly displays the condition of the wiper in discrete ranges of different colors.

13. The system of claim 7, wherein the controller is operative to accumulate and sum values of $\Delta P$, determined for each successive actuation of the cleaner; and, in response to the accumulated sum exceeding a predetermined value, effect opening of the drain valve.

14. A fluid filtering system comprising;

(a) a pressure vessel defining a filtering chamber with an inlet and outlet and having filtering media therein and a contaminant collecting chamber having a drain/purge port;

(b) a cleaner operative upon selective actuation to remove contaminant from the filter media and effect collection thereof in the contaminant collecting chamber;

(c) a drain/purge valve operative upon selective opening to effect opening of the drain purge port for purging collected contaminant; and, (d) an indicator operative to display in real time during flow through the filter media one of:

(i) the amount of contaminant collected relative to an amount which clogs the purge/drain port, (ii) the amount of contamination of the fluid entering the inlet relative to an amount known to be deleterious, and (iii) a combination of (i) and (ii).

15. The system of claim 14, wherein the indicator visibly displays discrete bands of the relative amount.

16. The system of claim 14, wherein the indicator visibly displays colored bands indicative of the relative amount.

17. The system of claim 14, wherein the indicator visibly displays the relative amount as a percentage.

18. The system to claim 7, wherein the controller is operable to determine the present condition of the pressurized fluid received at the inlet from comparison with threshold values of the time rate of change of $\Delta P$.

* * * * *